Jan. 17, 1967   J. L. WRIGHT   3,298,527
CHROMATOGRAPHIC FLOW COLUMN
Original Filed Nov. 2, 1962

INVENTOR
John L. Wright

BY  Frederick Moring
ATTORNEY

3,298,527
CHROMATOGRAPHIC FLOW COLUMN
John Lemon Wright, 51 Pratt Court,
Alexandria, Va. 22310
Continuation of application Ser. No. 234,986, Nov. 2, 1962. This application May 17, 1965, Ser. No. 458,832
2 Claims. (Cl. 210—198)

This is a continuation of Application No. 234,986 filed November 2, 1962, and now abandoned.

This invention relates to tubes, pipes and columns which contain fluid flow and are a part of equipment used for a process in which fluid velocity differences, temperature and/or fluid compositional differences throughout the cross section of the tube, pipe or column are of critical importance.

The significance of such processes is well known to those familiar with the chemical process industry, and is exemplified by chromatographic separation techniques. In many laboratory and industrial operations a need may arise for analysis procedures wherein the constitutents in fluid mixtures can be separated and measured with precision. A procedure which has become useful for such operations is the chromatographic separation procedure.

In a chromatographic separator, the fluid sample to be analyzed, together with a carrier fluid commonly referred to as the "moving phase", is introduced into a tube, pipe or column containing a "stationary phase", which may consist of a solid absorbing agent or a liquid partitioning agent. The stationary phase may be located within the column by adherence to the column wall or it may be distributed throughout the cross-sectional area of the column by its adherence to a "packing", i.e. a non-reacting substance such as finely divided firebrick or the like, which offers uniform interference to but does not completely obstruct the flow. As the moving phase tends to force the sample through the column, the various components of the sample will be retarded by the stationary phase and thus will be transported through the column at different rates of speed depending upon their affinity for the stationary phase. Accordingly, the components of the sample tend to separate into zones along the length of the column during their passage therethrough and thus emerge from the column at different times determined by their transport rate. Upon their emergence from the column, the moving phase and the separated sample components are passed through a detector, the response of which provides a qualitative and quantitative analysis of the sample components.

Of critical importance to the accuracy of the ultimate analysis of the sample components is the extent to which the individual components have been separated while in the column. Thus a more accurate analysis of the components is available if their separation from each other during their passage through the tube, pipe or column has been complete. Since a "clean separation" of zones in the tube is the desired effect, the efficiency of the process is determined by the cleanliness of completeness of the separation.

Several difficulties are encountered in accomplishing a clean separation. Varying amounts of overlapping of. components or zones may be caused by parameters of operating conditions, column construction, stationary phase, moving phase and sample. Of particular relevance to the instant invention, however, are other factors which affect the amount of zone overlap, i.e. the degree of uniformity of temperature and moving phase velocity in the column cross section, and the degree of uniformity in sample component concentration throughout the column cross section. In using the conventional chromatographic separator column, which comprises an elongated, open-ended cylinder, it may be necessary for a given analysis to provide a heating effect to the fluids within the column in order to facilitate the separation of the sample components. While the heating or cooling effect may be applied to the fluids by heating the exterior surface area of the column, difficulty is encountered in obtaining a uniform temperature throughout the cross section of the fluids within the column since that portion of the fluid adjacent the column wall will tend to differ in heat content from the fluid located near the center of the column. The lack of uniformity of temperature conditions throughout the cross section of the flow within the column then tends to impart *different transport rates* to different portions of the *same component,* and causes the undesirable zone widening. The absence of a uniform heat content throughout the cross section of flow is therefore a deterrent to efficient separation and accurate analysis of the sample components.

The uniformity of flowing velocity throughout the cross section of the column is also important to the efficiency of the chromatographic separation process. In the normal cylindrical column, resistance to fluid flow at the column wall differs from that at the column interior by reason of the presence or absence of packing in the interior of the tube and different velocities result. Thus, if packing is not provided in the column, there will be a greater resistance to fluid flow at a point adjacent to the column wall than at a point in the interior of the column, and an objectionable difference in flow velocity will be encountered across the column cross section. In those columns in which packing is provided, a greater flow resistance is encountered at the interior of the column than at the column wall. This is true since the packing ordinarily consists of granular material which, by reason of its shape, presents void spaces of greater area near the relatively flat column wall than in the interior of the column where the packed granules become more closely intermeshed with each other. In either case, resistance to flow is *different* at the column wall than at the interior of the column, and such difference in flow resistance produces undesirabe differences in flow velocity. This lack of uniform velocity throughout the column cross section tends to cause different portions of the same sample component to have different transport rates, thereby causing zone widening and a decreased separation efficiency.

In common practice the decreased separation efficiency caused by *velocity* differences and temperature differences is overcome by lengthening the column. However, this solution to the efficiency has significant disadvantages since longer analysis times inevitably result, additional very costly column materials must be provided and the unit will occupy additional space. The present invention provides means whereby the increased efficiency may be achieved without any of the foregoing disadvantages.

A further disadvantage found in most conventional chromatographic separator columns is the absence of a high degree of uniformity in concentration of the sample components within the column. This disadvantage is most pronounced in separator columns which are used in processes where the stationary phase is a liquid contained on the column wall and no interior packing or mounting is used to distribute the stationary phase throughout the cross section of the column. In such processes, it is apparent that the portion of the moving fluid nearer the center of the column will not react as promptly or to as great an extent with the wall-mounted stationary phase as will the portion of the moving fluid nearer the wall. This varying proximity of moving fluid to stationary phase is therefore conducive to zone widening and a decreased separation efficiency.

In order to improve the uniformity of sample component concentration, and thereby increase the accuracy of separation, it has become the practice to use separator columns of smaller diameter. Such columns offer smaller variations in the proximity of moving fluid to stationary phase and an increased concentration uniformity results. However, the limited sample sizes permitted by columns of the resultant small cross section creates serious difficulties of handling and separation.

Another problem inherent in most present-day chromatographic separators is the substantial amount of time required to place the column in a ready condition, i.e. a condition such that the column is ready to facilitate the separation process. Thus it is frequently necessary to heat or cool a column to a point where the heat content throughout the column is as nearly uniform as possible. In the conventional cylindrical column, the heating or cooling necessary to ready the column for the separation process can only be applied to the column walls. As a result of this mode of heat transfer, it is difficult to attain the goal of uniform temperature throughout the column cross section and considerable delay may be caused in waiting for the column to attain a heat content which is sufficiently uniform to allow the separation process to begin. The present invention provides means whereby the desired uniform column heat content may promptly be achieved and thus avoids the necessity of substantial delay in readying the column for operation.

In accordance with the present invention, the above disadvantages or factors leading to a loss of efficiency in component separation are overcome. The present invention provides an improved separator column, which may be made of stainless steel, copper, brass or other suitable material, and which has a series of regularly spaced longitudinally and radially extending fin members mounted on the inner wall of the column. These fin members present wall surfaces which contact the fluids moving through the column at points throughout the cross section of the column. By the use of such fin members, the heating or cooling effect which is produced as a part of the chromatographic separation process effect can uniformly be produced throughout the cross section of the column and the uniform heat transfer rate which is essential to efficient separation of sample components is created. The rate at which a column can uniformly be heated or cooled in preparation for a separation process is also increased by reason of the fin members ability to conduct heat. The fin members also present frictional surfaces throughout the cross section of the separator column. Accordingly, in an unpacked column, when the moving phase travels through the column it encounters flow resistance not only at the inner periphery of the column wall but also at the surfaces of the fin members as well, such fin members being distributed evenly throughout the cross section of the column. The presence of the fin members thereby tends to reduce the differences in flow velocity. Conversely, in a packed column, when the moving phase travels through the column, a greater resistance to flow is offered at the interior portions of the granular packing material than by the packing located adjacent to a column wall and adjacent to the fin walls. However, since the surfaces of the fins are distributed throughout the cross section of the column, the forces tending to produce differences in flow velocity are thereby more uniformly arranged throughout the cross section of the tube, and a relatively uniform flow velocity can thus be attained.

Finally, the fin members, when used in an unpacked tube, permit the mounting of the liquid stationary phase at points throughout the cross section of the tube and thereby produce an increased uniformity of sample component concentration. This results in more efficient separation of the sample components because the sample components moving through the column can interact with the stationary phase at points located throughout the cross section of the column, i.e., at any fin wall, and not merely at the column wall itself. Since the distance to be traveled by the sample component in coming in contact with the stationary phase is thus greatly reduced (as compared with the distance in an unfinned tube), the interaction process can take place in a shorter amount of time than in the unfinned column, and the width of the zone occupied by a given sample component within the column is reduced as compared with that in an unfinned column of the same general size. Stated another way, the interaction process can, in the finned tube, take place at virtually any point throughout the cross section of the tube hence the concentration of the sample component, i.e., the "product" of the interaction between moving phase and stationary phase, becomes more nearly the same throughout the cross section of the column. The present invention thus provides a substantially increased separation efficiency in chromatographic separator columns over that available in conventional separator columns. The present invention satisfactorily disposes of three problems encountered in obtaining efficient chromatographic separation, i.e. uniformity of cross-sectional temperature, uniformity of cross-sectional flow velocity and uniformity of component concentration and avoids the necessity of decreasing the column diameter to obtain uniform component concentration.

In accordance with the foregoing, the objects of the present invention are as follows:

To reduce fluid velocity differences throughout the cross section of tubes, pipes, or columns used to contain fluid flow;

To reduce fluid velocity differences throughout the cross section of tubes, pipes, or columns used to contain fluid flow and which tubes, pipes or columns constitute an element of equipment used for a separation process;

To reduce velocity differences throughout the cross section of a tube, pipe or column which constitutes an element of equipment used for separation processes in which the components to be separated are distributed between two phases;

To reduce velocity differences throughout the cross section of tubes, pipes, or columns which contain a stationary phase and which constitute an element of a chromatographic separation device;

To provide means for a separation process which facilitates increased separation efficiency and avoid the necessity of reducing separator column diameter.

Further important objectives of this invention are as follows:

To reduce temperature differences throughout the cross section of tubes, pipes, or columns which contain fluid flow;

To reduce temperature differences throughout the cross section of packed tubes, pipes or columns used to contain fluid flow:

To reduce temperature differences throughout the cross section of tubes, pipes, or columns which contain fluid flow and which constitute an element of equipment used for separation processes in which the components to be separated become distributed between two phases;

To provide means whereby greater heating rates may be applied to a given diameter separator column without substantial loss in separation efficiency;

To reduce velocity differences throughout the cross section of tubes, pipes, or columns containing a stationary phase and which constitute an element of a chromatographic separation device;

To provide means for increasing the rate at which a uniform temperature may be achieved throughout a column cross section.

Still further important objectives of this invention are as follows:

To decrease composition differences throughout the cross section of tubes which contain fluid flow and which constitute an element of equipment for separation processes in which the components to be separated are distributed between two phases;

To decrease composition differences throughout the cross section of tubes which contain fluid flow and which constitute an element of equipment for separation processes in which the components to be separated are distributed between a mobile phase and a stationary phase which is contained on the tube wall;

To decrease compositional differences throughout the cross section of pipes, tubes, or columns used to contain fluid flow and which constitute an element of a chromatographic separation device.

Referring now to the drawings.

Figure 1:
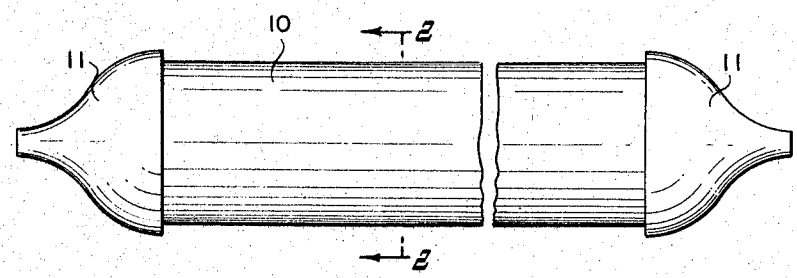
FIGURE 1 is an exterior plan view of the improved separator column which constitutes the subject matter of this invention.
Figure 2:
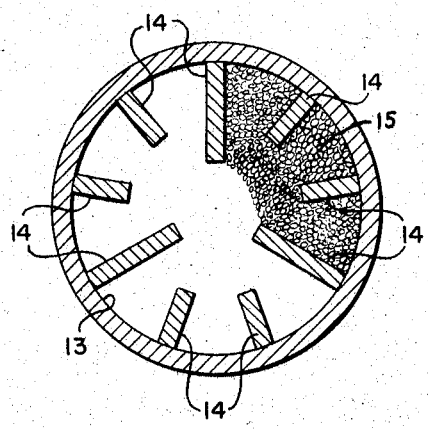
FIGURE 2 shows a section of the column taken along the line 2—2 in FIGURE 1.

Referring more specifically to the drawings, the present invention comprises a separator tube or column 10, which may be made of metal, glass or other material and may be of any suitable length. The separator column 10 is received at each end in similar housings 11 which constitute the means whereby the tube is attached or incorporated as an element in a chromatographic or other process. Securely mounted by means of welding, soldering etc. on the interior 13 of the separator column 10 are a series of longitudinal members or fins 14 (FIGURE 2). The fins 14, however, may be integral with the separator column as the result of extrusion of the column, for instance, and the manner of uniting the fins with the tube, pipe, or column is not critical to the operation of the instant device. The fins 14 may be rectangular in cross section or may have arcuate surfaces at their radial ends and at their joints with the inner circumference of the tube, and extend along the entire length of the separator column 10. The fins 14, which may be as many as 9 or more in number, are mounted at evenly spaced intervals along the inner circumference of the column 10 and extend in the radial direction a distance which is less than the radius of the column 10. While not an essential relationship, in practice the operation of the column has been found more satisfactory when nine fins as shown in FIGURE 2 are used and when every third fin, as also shown in FIGURE 2, is of equal radial length and is also slightly longer in its radial dimension than the two longitudinal fins 14 affixed to the inner circumference of the column on either side of such fin. Depending on the specific process to be performed, the interior of the column may be filled with a packing material, such as the granular material 15 which, for convenience, is shown as filling only a portion of the interior of the column in FIGURE 2.

Figure 3:
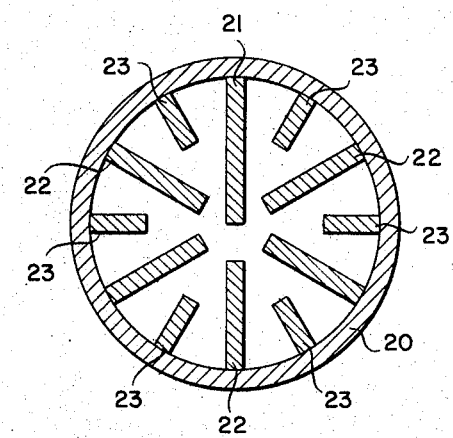
FIGURE 3 is a cross-sectional view of another separator column which constitutes a second embodiment of the present invention.

In FIGURE 3 there is shown a second embodiment of the separator column which is the subject of this invention. This embodiment, as in the case of the FIGURE 2 embodiment, may be of any desired length and differs from the FIGURE 2 embodiment only in the design of the fins mounted on the interior walls of the column 20.

In accordance with the FIGURE 3 modification, a single predominant fin 21 has a radial dimension equal to the radius of the separator column 20 and greater than the radial dimension of any other fin. Five further fins 22 having equal radial dimensions are located at points evenly spaced around the inner circumference of the separator column 20, i.e. at points which are respectively 60 degrees, 120 degrees, 180 degrees, and 240 degrees and 300 degrees clockwise from the location of the predominant fin 21. The radial dimension of each of the fins 22 is substantially less than that of the predominant fin 21. A third set of six fins 23 is also included in the FIGURE 3 embodiment of this invention, and each such fin 23 has the same radial dimension, which is less than the radial dimension of the fins 22. The fins 23 are spaced evenly between the fins 22 and the predominant fin 21, so that the fins 23 are each 60 degrees apart, beginning at a point 30 degrees clockwise from the predominant fin 21.

Although not shown, the joints between the fins and the separator column wall may be arcuate rather than angular. Similarly, the present invention contemplates either arcuate surfaces at the exposed ends of the fins or angular exposed fin ends as shown in FIGURE 2.

In the operation of the instant device, the stationary phase is first installed in the column by mounting the same upon a packing or by its adherence to the walls of the column and the fins. The moving phase and the sample to be analyzed are then introduced at one end of the column. As stated above, the moving phase tends to draw the sample through the column while the stationary phase retards the passage of the sample. During the interaction of the stationary phase, moving phase and sample, the fins within the column are able to impart a more uniform moving phase flow velocity at any given point along the length of the column than would be possible in the case of a conventional column since the fins provide like friction at regularly spaced points throughout the column. The increased uniformity of flow velocity causes a decreased amount of zone widening, as explained above, and thereby improves the efficiency of the separation process.

An increase in uniformity of sample component concentration is provided by the present invention since the fins afford means whereby the stationary phase can be located throughout the cross section of an unpacked column.

The above functional advantages may be accentuated in actual practice by placing several identical columnar segments constructed in accordance with this invention in an end-to-end relationship and then, prior to permanently affixing such segments in this position, rotating each segment relative to the segments adjacent to it. For instance, when an overall separator column length is decided upon, three segments of the finned column shown in FIGURE 2 could be constructed, each having a length equal to one-third of the overall column length. These segments could then be placed end-to-end in a manner such that the fins of the first and third segment were angularly aligned with each other but with the fins of the middle segment rotated sixty degrees from the aligned-fin position. The three segments may then be integrated or united by welding or other suitable process so that a single column with a varying configuration of fins is produced. In this manner, whatever variations in flow velocity, heat content or concentration of sample components remain despite the improvement in these factors resulting from the use of fins is even further minimized since any undesirable patterns of flow or separation will be interrupted at least twice during the passage of the fluids through the column.

This same concept of segmentation and rotation of the instant separator column may be adapted to columns comprising two segments, four segments, etc. The manner in which the principle would be applicable to columns comprising other than three segments is deemed obvious and no further explanation is deemed necessary.

A further adaptation of the present invention (not shown) is designed to offset the undesirable longitudinal flow gradients existing in columns of uniform diameter which arise from pressure gradients along the length of the column. Thus the finned column may be divided into sections wherein the fins occupy different proportions of the column cross section. The section of the column having fins which occupy the smallest proportion of the column cross section would constitute the terminal fin section; the section having fins which occupy the largest proportion of the column cross section would constitute the opposite end of the column; and the sections located between such extremes would have fins occupying intermediate proportions of the column cross section.

I claim the following:

1. A flow column for use in a chromatographic separation process adapted to receive a stationary phase material, a moving phase fluid and a sample component and comprising a metallic tubular member, means mounted within said tubular member to provide uniform flow velocity, even heat distribution and uniform concentrations within the moving phase fluid, said means comprising a plurality of fin members mounted on the inner wall of said tubular member and extending inwardly and longitudinally therethrough, said fin members being coated with a stationary phase material, said fin members being mounted on the inner wall of the tubular member at evenly spaced intervals, said fin members being of uniform cross-sectional thickness and the inward extension of certain of the fin members being greater than that of the others.

2. A flow column adapted to receive a moving phase fluid and a sample component and comprising a metallic tubular member, said tubular member containing a granular packing material, a stationary phase material located on and coating the exterior surface of the packing material, means mounted within said tubular member to provide even heat distribution and uniform concentrations within the moving phase material and stationary phase material and to provide uniform flow resistance to the moving phase material, said means comprising fin members mounted on the inner wall of said tubular member at evenly spaced intervals and extending radially and longitudinally therethrough, said fin members being of uniform cross-sectional thickness and the radial dimension of certain of the fin members being greater than that of others.

References Cited by the Examiner

UNITED STATES PATENTS

| 2,930,405 | 3/1960 | Welsh | 138—38 |
| 2,950,740 | 8/1960 | Bock | 138—38 |
| 3,002,729 | 10/1961 | Welsh | 165—179 |
| 3,005,514 | 10/1961 | Cole et al. | 55—386 |
| 3,063,286 | 11/1962 | Nerheim | 55—386 |
| 3,143,404 | 8/1964 | Heigl | 55—208 |
| 3,159,996 | 12/1964 | Norem | 73—23.1 |
| 3,224,168 | 12/1965 | Gregory | 55—208 |

FOREIGN PATENTS 1,298,653   6/1962   France.

REUBEN FRIEDMAN, *Primary Examiner.*

J. DeCESARE, *Assistant Examiner.*